(12) United States Patent
Kim et al.

(10) Patent No.: US 11,315,021 B2
(45) Date of Patent: *Apr. 26, 2022

(54) METHOD AND DEVICE FOR ON-DEVICE CONTINUAL LEARNING OF A NEURAL NETWORK WHICH ANALYZES INPUT DATA, AND METHOD AND DEVICE FOR TESTING THE NEURAL NETWORK TO BE USED FOR SMARTPHONES, DRONES, VESSELS, OR MILITARY PURPOSE

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 639 days.

This patent is subject to a terminal disclaimer.

(21) Appl. No.: 16/259,389

(22) Filed: Jan. 28, 2019

(65) Prior Publication Data

US 2020/0242475 A1    Jul. 30, 2020

(51) Int. Cl.
*G06N 3/08* (2006.01)
*G06N 3/04* (2006.01)

(52) U.S. Cl.
CPC ............... *G06N 3/084* (2013.01); *G06N 3/04* (2013.01)

(58) Field of Classification Search
CPC ............ G06N 3/04; G06N 3/084; G06N 3/08; G06N 3/0454; G06N 3/0472; G06K 9/20
See application file for complete search history.

(56) References Cited

U.S. PATENT DOCUMENTS 10,210,631 B1 * 2/2019 Cinnamon ............ G06T 11/003
2019/0122120 A1 * 4/2019 Wu ....................... G06N 3/0472
(Continued)

FOREIGN PATENT DOCUMENTS

CN      108830285 A    11/2018
JP      2018026122 A    2/2018

OTHER PUBLICATIONS

Goodfellow, Ian. "Nips 2016 tutorial: Generative adversarial networks." arXiv preprint arXiv:1701.00160v4 (2016): 1-57 (Year: 2016).*

(Continued)

*Primary Examiner* — Kamran Afshar
*Assistant Examiner* — Randall K. Baldwin
(74) *Attorney, Agent, or Firm* — Husch Blackwell LLP (57) ABSTRACT

A method for on-device continual learning of a neural network which analyzes input data is provided to be used for smartphones, drones, vessels, or a military purpose. The method includes steps of: a learning device, (a) sampling new data to have a preset first volume, instructing an original data generator network, which has been learned, to repeat outputting synthetic previous data corresponding to a k-dimension random vector and previous data having been used for learning the original data generator network, such that the synthetic previous data has a second volume, and generating a batch for a current-learning; and (b) instructing the (Continued)

neural network to generate output information corresponding to the batch. The method can be performed by generative adversarial networks (GANs), online learning, and the like. Also, the present disclosure has effects of saving resources such as storage, preventing catastrophic forgetting, and securing privacy.

24 Claims, 7 Drawing Sheets

(56) References Cited

U.S. PATENT DOCUMENTS

| | | | |
|---|---|---|---|
| 2019/0130266 A1* | 5/2019 | Cao | G06N 3/08 |
| 2019/0251612 A1* | 8/2019 | Fang | G06Q 30/0621 |
| 2020/0134415 A1* | 4/2020 | Haidar | G06N 3/0472 |
| 2020/0134463 A1* | 4/2020 | Haidar | G06N 3/0454 |

OTHER PUBLICATIONS

Shin, Hanul, et al. "Continual learning with deep generative replay." arXiv preprint arXiv:1705.08690v3 (Dec. 2017): 1-10 (Year: 2017).*

Ishan Durugkar, Ian Gemp, and Sridhar Mahadevan, "Generative Multi-Adversarial Networks", Mar. 2, 2017, arXiv: 1-14 (Year: 2017).*

Luan Tran, Xi Yin, and Xiaoming Liu, "Disentangled Representation Learning GAN for Pose-Invariant Face Recognition", 2017, The IEEE Conference on Computer Vision and Pattern Recognition (CVPR): 1415-1424 (Year: 2017).*

Vijay Rengarajan, Yogesh Balaji, and A.N. Rajagopalan, "Unrolling the Shutter: CNN to Correct Motion Distortions", 2017, The IEEE Conference on Computer Vision and Pattern Recognition (CVPR): 2291-2299 (Year: 2017).*

Tolstikhin, Ilya, et al. "Adagan: Boosting generative models." arXiv preprint arXiv:1701.02386v2 (2017): 1-31 (Year: 2017).*

Wu, Chenshen, et al. "Memory replay gans: learning to generate images from new categories without forgetting." arXiv preprint arXiv: 1809.02058v2 (2018): 1-10 (Year: 2018).*

Wu, Yue, et al. "Incremental classifier learning with generative adversarial networks." arXiv preprint arXiv: 1802.00853 (2018): 1-10. (Year: 2018).*

Kim, Jangho, et al. "HC-Net: Memory-based Incremental Dual-Network System for Continual learning." (2018): 1-13. (Year: 2018).*

Christopher Bowles, Roger Gunn, Alexander Hammers, and Daniel Rueckert, "GANsfer Learning: Combining labelled and unlabelled data for GAN based data augmentation", Nov. 26, 2018, arXiv: 1-10 (Year: 2018).*

Hanul Shin et al., "Continual Learning with Deep Generative Replay", Arxiv.org, Cornell University Library, May 24, 2017 (10 pages).

EP, European Search Report, European Application No. 20151832.1 dated Jul. 27, 2020 (16 pages).

Wu, Chenshen et al., "Memory Replay GANs: learning to generate images from new categories without forgetting", arXiv.org, Sep. 6, 2018, Cornell University Library, 201 Olin Library Cornell University, Ithaca, NY 14853.

India Office Action dated Nov. 30, 2021, issued in corresponding India application.

Ratio Tai ( and 2 others), "Generative Adversarial Nets" "Suppression of Mode Collapse", Technical research report, vol. 117, No. 520 , General Incorporated Electronic Information Communication Engineers, Mar. 19, 2018, pp. 1 to 6, and ISSN: 0913-5685.

Takagi Englishs, "Neural Nets Part II: Basic Introductory Design," Journal of Fuzzy Science, vol. 4, No. 4 , Japan Fuzzy Logic, Aug. 1992, pp. 76 to 87.

Japanese Office Action dated Oct. 19, 2021, issued in corresponding Japanese application.

* cited by examiner

METHOD AND DEVICE FOR ON-DEVICE CONTINUAL LEARNING OF A NEURAL NETWORK WHICH ANALYZES INPUT DATA, AND METHOD AND DEVICE FOR TESTING THE NEURAL NETWORK TO BE USED FOR SMARTPHONES, DRONES, VESSELS, OR MILITARY PURPOSE

FIELD OF THE DISCLOSURE

The present disclosure relates to a learning method and a learning device, a testing method and a testing device for use with an autonomous vehicle, virtual driving, and the like; and more particularly, to the learning method and the learning device for on-device continual learning of a neural network which analyzes input data, and the testing method and the testing device using the same.

BACKGROUND OF THE DISCLOSURE

In general, deep learning is defined as a set of machine learning algorithms that try to achieve a high level of abstraction through a combination of various nonlinear transformation techniques, and is a field of machine learning that teaches computers how to think like people do.

A number of researches have been carried out to express data in the form that the computers can understand, for example, pixel information of an image as a column vector, and to apply it to the machine learning. As a result of this effort, a variety of deep learning techniques such as deep neural networks, convolutional neural networks, and recurrent neural networks have been applied to various fields like computer vision, voice recognition, natural language processing, and voice/signal processing, etc., and high performing deep learning networks have been developed.

These deep learning networks are evolving into a large scale model with a deep hierarchy and wide features in order to improve the recognition performance.

In particular, learning of the deep learning network is mainly carried out on servers on-line because of the necessity of large-scale training data and high computing power.

However, it is impossible to perform learning on the servers in a personal mobile device environment where personal data cannot be transmitted to the servers for learning purposes due to privacy concerns, or in environments of a military, a drone, or a ship where the device is often out of the communication network.

Therefore, on-device learning of the deep learning network should be performed in the local device where it is impossible to learn on the servers.

However, the local device performing on-device learning has no room for storage of the training data, and thus it is difficult to perform on-device learning.

In addition, when learning the deep learning network with new training data, if the new training data is different from past training data, the deep learning network gradually forgets what has been learned in the past. As a result, a catastrophic forgetting problem will occur.

SUMMARY OF THE DISCLOSURE

It is an object of the present disclosure to solve all the aforementioned problems.

It is another object of the present disclosure to continuously use training data without storing on a local device performing on-device learning.

It is still another object of the present disclosure to use past training data without storing, in learning with new training data.

It is still yet another object of the present disclosure to perform on-device learning of a neural network without catastrophic forgetting on the local device performing on-device learning.

In accordance with one aspect of the present disclosure, there is provided a method for on-device continual learning of a neural network which analyzes input data, including steps of: (a) a learning device, if new data acquired for learning reaches a preset base volume, sampling the new data such that the new data has a preset first volume, inputting at least one k-dimension random vector into an original data generator network which has been learned, to thereby instruct the original data generator network to repeat a process of outputting first synthetic previous data corresponding to the k-dimension random vector and also corresponding to previous data having been used for learning the original data generator network, such that the first synthetic previous data has a preset second volume, and generating a first batch to be used for a first current-learning by referring to the new data of the preset first volume and the first synthetic previous data of the preset second volume; and (b) the learning device instructing the neural network to generate output information corresponding to the first batch by inputting the first batch into the neural network, instructing a first loss layer to calculate one or more first losses by referring to the output information and its corresponding ground truth ("GT"), and performing the first current-learning of the neural network by backpropagating the first losses.

As one example, the method further includes steps of: (c) the learning device sampling the new data such that the new data has the preset first volume, cloning the original data generator network to thereby generate a cloned data generator network, instructing the cloned data generator network to repeat a process of outputting second synthetic previous data corresponding to the k-dimension random vector and also corresponding to the previous data having been used for learning the original data generator network such that the second synthetic previous data has the preset second volume, instructing the original data generator network to repeat a process of outputting third synthetic previous data corresponding to the k-dimension random vector and also corresponding to the previous data having been used for learning the original data generator network such that the third synthetic previous data has a preset third volume which equals to a sum of the preset first volume and the preset second volume, and generating a second batch to be used for a second current-learning by referring to the new data of the preset first volume, the second synthetic previous data of the preset second volume, and the third synthetic previous data of the preset third volume; and (d) the learning device instructing a discriminator to generate score vectors corresponding to the second batch by inputting the second batch into the discriminator, instructing a second loss layer to calculate one or more second losses by referring to the score vectors and their corresponding ground truths ("GTs"), and performing the second current-learning of the discriminator and the original data generator network by backpropagating the second losses.

As one example, the learning device repeats the steps of (c) and (d) until losses of the discriminator and losses of the second data generator network respectively reach convergence states by backpropagating the second losses.

As one example, at the step of (d), the learning device performs a gradient ascent of the discriminator and the second data generator network by backpropagating the second losses.

As one example, at the step of (d), the learning device, in performing the second current-learning of the discriminator by backpropagating the second losses, regards the second synthetic previous data from the cloned data generator network as real data and performs the second current-learning of the discriminator.

As one example, at the step of (d), the learning device performs the second current-learning of the original data generator network such that third synthetic previous data score vectors, corresponding to the third synthetic previous data, among the score vectors are maximized.

As one example, at the step of (d), the learning device deletes the new data after completion of the second current-learning, and updates the original data generator network such that the new data and the second synthetic previous data are outputted as the previous data for use in a next learning.

As one example, if the second current-learning is a first learning, at the step of (a), the learning device generates the first batch using only the new data of the preset first volume, and, at the step of (c), the learning device instructs the original data generator network to repeat a process of outputting third synthetic previous data corresponding to the k-dimension random vector such that the third synthetic previous data has the preset first volume, and generates the second batch by referring to the new data of the preset first volume and the third synthetic previous data of the preset first volume.

As one example, the learning device repeats the steps of (a) and (b) until the first losses reaches a convergence state by backpropagating the first losses.

As one example, at the step of (b), the learning device performs a gradient descent of the neural network by backpropagating the first losses.

Figure 3:
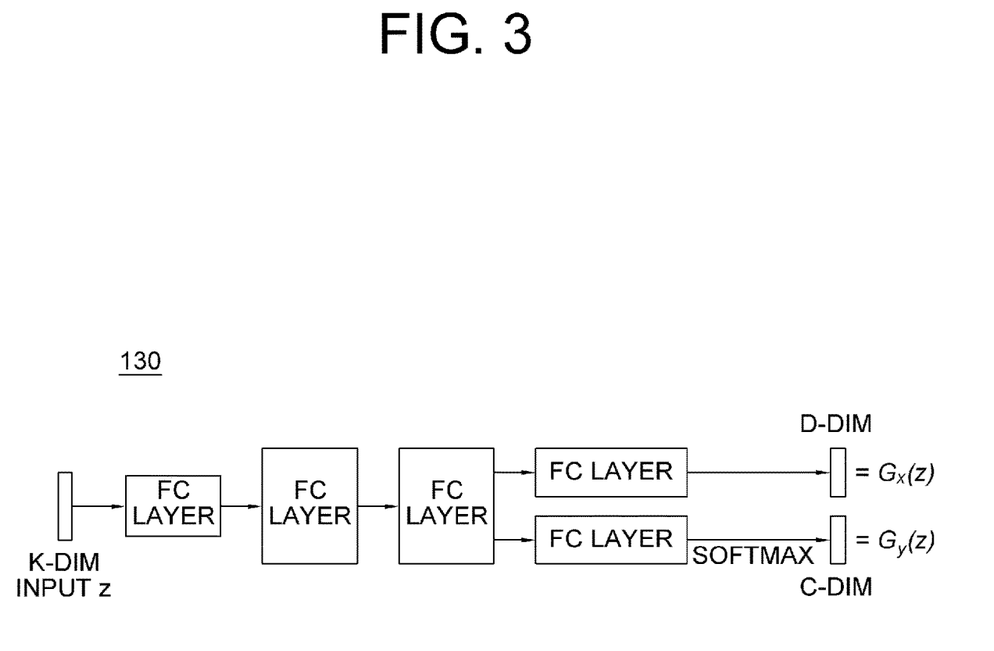
FIG. 3 is a drawing schematically illustrating one example of a data generator network which generates past training data in a method for on-device continual learning of the neural network which analyzes input data by using deep learning in accordance with one example embodiment of the present disclosure.

As one example, in case that the neural network is a classifier which accepts at least one vector as its input, the original data generator network includes one or more fully connected ("FC") layers which apply at least one fully connected operation to k-dimension information corresponding to the k-dimension random vector and generate at least one D-dimensional vector and at least one C-dimensional one-hot vector, where "D" is an integer representing a dimension of an output (See FIG. 3) and "C" is an integer representing a dimension of another output, i.e., one hot vector (See FIG. 3).

As one example, if the neural network is an object detector which accepts at least one RGB image as its input, the original data generator network includes one or more transposed convolutional layers which transform 1×1×K information corresponding to the k-dimension random vector into at least one H×W×3 tensor, and a faster R-CNN which analyzes the H×W×3 tensor and generates at least one R×(4+C) vector wherein R includes at least one R-dimensional vector and (4+C) includes $x_1$, $y_1$, $x_2$, $y_2$, and at least one C-dimensional one-hot vector, where "K" is an integer representing a dimension of an input (See FIG. 3), "H" is the height of a tensor $G_x(z)$ (See FIG. 3), "W" is the width of a tensor $G_x(z)$ (See FIG. 3), "R" is an integer (=4+C) representing a dimension of an output (See FIG. 4), and $x_1$, $y_1$, $x_2$, $y_2$ are parts of the R-dimensional output.

In accordance with another aspect of the present disclosure, there is provided a testing method for testing a neural network which has completed on-device continual learning, including steps of: (a) a testing device acquiring test data, on condition that a learning device has performed processes of (1) sampling new data which reaches a preset base volume such that the new data has a preset first volume, inputting at least one k-dimension random vector into an original data generator network which has been learned, to thereby instruct the original data generator network to repeat a process of outputting first synthetic previous data corresponding to the k-dimension random vector and also corresponding to previous data having been used for learning the original data generator network, such that the first synthetic previous data has a preset second volume, and generating a first batch to be used for a first current-learning by referring to the new data of the preset first volume and the first synthetic previous data of the preset second volume, and (2) instructing the neural network to generate output information for training corresponding to the first batch by inputting the first batch into the neural network, instructing a first loss layer to calculate one or more first losses by referring to the output information for training and its corresponding GT, and performing the first current-learning of the neural network by backpropagating the first losses; and (b) the testing device instructing the neural network to generate output information for testing corresponding to the test data by inputting the test data into the neural network.

As one example, the learning device further has performed processes of (3) sampling the new data such that the new data has the preset first volume, cloning the original data generator network to thereby generate a cloned data generator network, instructing the cloned data generator network to repeat a process of outputting second synthetic previous data corresponding to the k-dimension random vector and also corresponding to the previous data having been used for learning the original data generator network such that the second synthetic previous data has the preset second volume, instructing the original data generator network to repeat a process of outputting third synthetic previous data corresponding to the k-dimension random vector and also corresponding to the previous data having been used for learning the original data generator network such that the third synthetic previous data has a preset third volume which equals to a sum of the preset first volume and the preset second volume, and generating a second batch to be used for a second current-learning by referring to the new data of the preset first volume, the second synthetic previous data of the preset second volume, and the third synthetic previous data of the preset third volume, and (4) instructing a discriminator to generate score vectors corresponding to the second batch by inputting the second batch into the discriminator, instructing a second loss layer to calculate one or more second losses by referring to the score vectors and their corresponding GTs, and performing the second current-learning of the discriminator and the original data generator network by backpropagating the second losses.

In accordance with still another aspect of the present disclosure, there is provided a learning device for on-device continual learning of a neural network which analyzes input data, including: at least one memory that stores instructions; and at least one processor configured to execute the instructions to: perform processes of: (I) if new data acquired for learning reaches a preset base volume, sampling the new data such that the new data has a preset first volume, inputting at least one k-dimension random vector into an original data generator network which has been learned, to thereby instruct the original data generator network to repeat a process of outputting first synthetic previous data corresponding to the k-dimension random vector and also corresponding to previous data having been used for learning the original data generator network, such that the first synthetic previous data has a preset second volume, and generating a first batch to be used for a first current-learning by referring to the new data of the preset first volume and the first synthetic previous data of the preset second volume, and (II) instructing the neural network to generate output information corresponding to the first batch by inputting the first batch into the neural network, instructing a first loss layer to calculate one or more first losses by referring to the output information and its corresponding GT, and performing the first current-learning of the neural network by backpropagating the first losses.

As one example, the processor further performs processes of: (III) sampling the new data such that the new data has the preset first volume, cloning the original data generator network to thereby generate a cloned data generator network, instructing the cloned data generator network to repeat a process of outputting second synthetic previous data corresponding to the k-dimension random vector and also corresponding to the previous data having been used for learning the original data generator network such that the second synthetic previous data has the preset second volume, instructing the original data generator network to repeat a process of outputting third synthetic previous data corresponding to the k-dimension random vector and also corresponding to the previous data having been used for learning the original data generator network such that the third synthetic previous data has a preset third volume which equals to a sum of the preset first volume and the preset second volume, and generating a second batch to be used for a second current-learning by referring to the new data of the preset first volume, the second synthetic previous data of the preset second volume, and the third synthetic previous data of the preset third volume, and (IV) instructing a discriminator to generate score vectors corresponding to the second batch by inputting the second batch into the discriminator, instructing a second loss layer to calculate one or more second losses by referring to the score vectors and their corresponding GTs, and performing the second current-learning of the discriminator and the original data generator network by backpropagating the second losses.

As one example, the processor repeats the processes of (III) and (IV) until losses of the discriminator and losses of the second data generator network respectively reach convergence states by backpropagating the second losses.

As one example, at the process of (IV), the processor performs a gradient ascent of the discriminator and the second data generator network by backpropagating the second losses.

As one example, at the process of (IV), the processor, in performing the second current-learning of the discriminator by backpropagating the second losses, regards the second synthetic previous data from the cloned data generator network as real data and performs the second current-learning of the discriminator.

As one example, at the process of (IV), the processor performs the second current-learning of the original data generator network such that third synthetic previous data score vectors, corresponding to the third synthetic previous data, among the score vectors are maximized.

As one example, at the process of (IV), the processor deletes the new data after completion of the second current-learning, and updates the original data generator network such that the new data and the second synthetic previous data are outputted as the previous data for use in a next learning.

As one example, if the second current-learning is a first learning, at the process of (I), the processor generates the first batch using only the new data of the preset first volume, and, at the process of (III), the processor instructs the original data generator network to repeat a process of outputting third synthetic previous data corresponding to the k-dimension random vector such that the third synthetic previous data has the preset first volume, and generates the second batch by referring to the new data of the preset first volume and the third synthetic previous data of the preset first volume.

As one example, the processor repeats the processes of (I) and (II) until the first losses reaches a convergence state by backpropagating the first losses.

As one example, at the process of (II), the processor performs a gradient descent of the neural network by backpropagating the first losses.

As one example, in case that the neural network is a classifier which accepts at least one vector as its input, the original data generator network includes one or more FC layers which apply at least one fully connected operation to k-dimension information corresponding to the k-dimension random vector and generate at least one D-dimensional vector and at least one C-dimensional one-hot vector.

As one example, if the neural network is an object detector which accepts at least one RGB image as its input, the original data generator network includes one or more transposed convolutional layers which transform 1×1×K information corresponding to the k-dimension random vector into at least one H×W×3 tensor, and a faster R-CNN which analyzes the H×W×3 tensor and generates at least one R×(4+C) vector wherein R includes at least one R-dimensional vector and (4+C) includes $x_1$, $y_1$, $x_2$, $y_2$, and at least one C-dimensional one-hot vector.

In accordance with still yet another aspect of the present disclosure, there is provided a testing device for testing a neural network which has completed on-device continual learning, including: at least one memory that stores instructions; and at least one processor, on condition that a learning device has performed processes of (1) sampling new data which reaches a preset base volume such that the new data has a preset first volume, inputting at least one k-dimension random vector into an original data generator network which has been learned, to thereby instruct the original data generator network to repeat a process of outputting first synthetic previous data corresponding to the k-dimension random vector and also corresponding to previous data having been used for learning the original data generator network, such that the first synthetic previous data has a preset second volume, and generating a first batch to be used for a first current-learning by referring to the new data of the preset first volume and the first synthetic previous data of the preset second volume, and (2) instructing the neural network to generate output information for training corresponding to the first batch by inputting the first batch into the neural network, instructing a first loss layer to calculate one or more first losses by referring to the output information for training and its corresponding GT, and performing the first current-learning of the neural network by backpropagating the first losses; configured to execute the instructions to: perform a process of instructing the neural network to generate output information for testing corresponding to acquired test data by inputting the test data into the neural network.

As one example, the learning device further has performed processes of: (3) sampling the new data such that the new data has the preset first volume, cloning the original data generator network to thereby generate a cloned data generator network, instructing the cloned data generator network to repeat a process of outputting second synthetic previous data corresponding to the k-dimension random vector and also corresponding to the previous data having been used for learning the original data generator network such that the second synthetic previous data has the preset second volume, instructing the original data generator network to repeat a process of outputting third synthetic previous data corresponding to the k-dimension random vector and also corresponding to the previous data having been used for learning the original data generator network such that the third synthetic previous data has a preset third volume which equals to a sum of the preset first volume and the preset second volume, and generating a second batch to be used for a second current-learning by referring to the new data of the preset first volume, the second synthetic previous data of the preset second volume, and the third synthetic previous data of the preset third volume, and (4) instructing a discriminator to generate score vectors corresponding to the second batch by inputting the second batch into the discriminator, instructing a second loss layer to calculate one or more second losses by referring to the score vectors and their corresponding GTs, and performing the second current-learning of the discriminator and the original data generator network by backpropagating the second losses.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
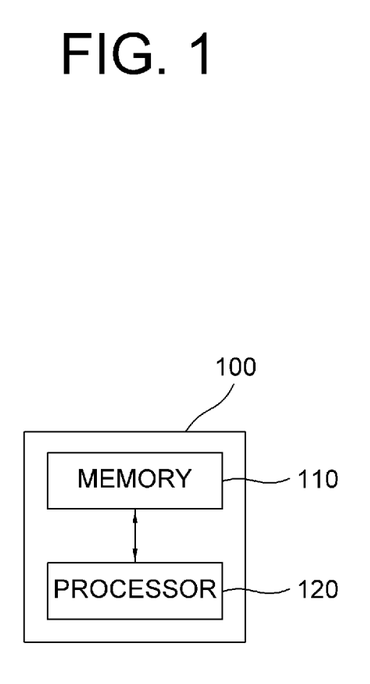
FIG. 1 is a drawing schematically illustrating a learning device for on-device continual learning of a neural network which analyzes input data by using deep learning in accordance with one example embodiment of the present disclosure.

FIG. 1 is a drawing schematically illustrating a learning device for on-device continual learning of a neural network which analyzes input data by using deep learning in accordance with one example embodiment of the present disclosure. By referring to FIG. 1, a learning device 100 may include a memory 110 for storing instructions to perform on-device continual learning of the neural network, and a processor 120 for performing processes corresponding to the instructions in the memory 110 to perform on-device continual learning of the neural network.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Figure 2:
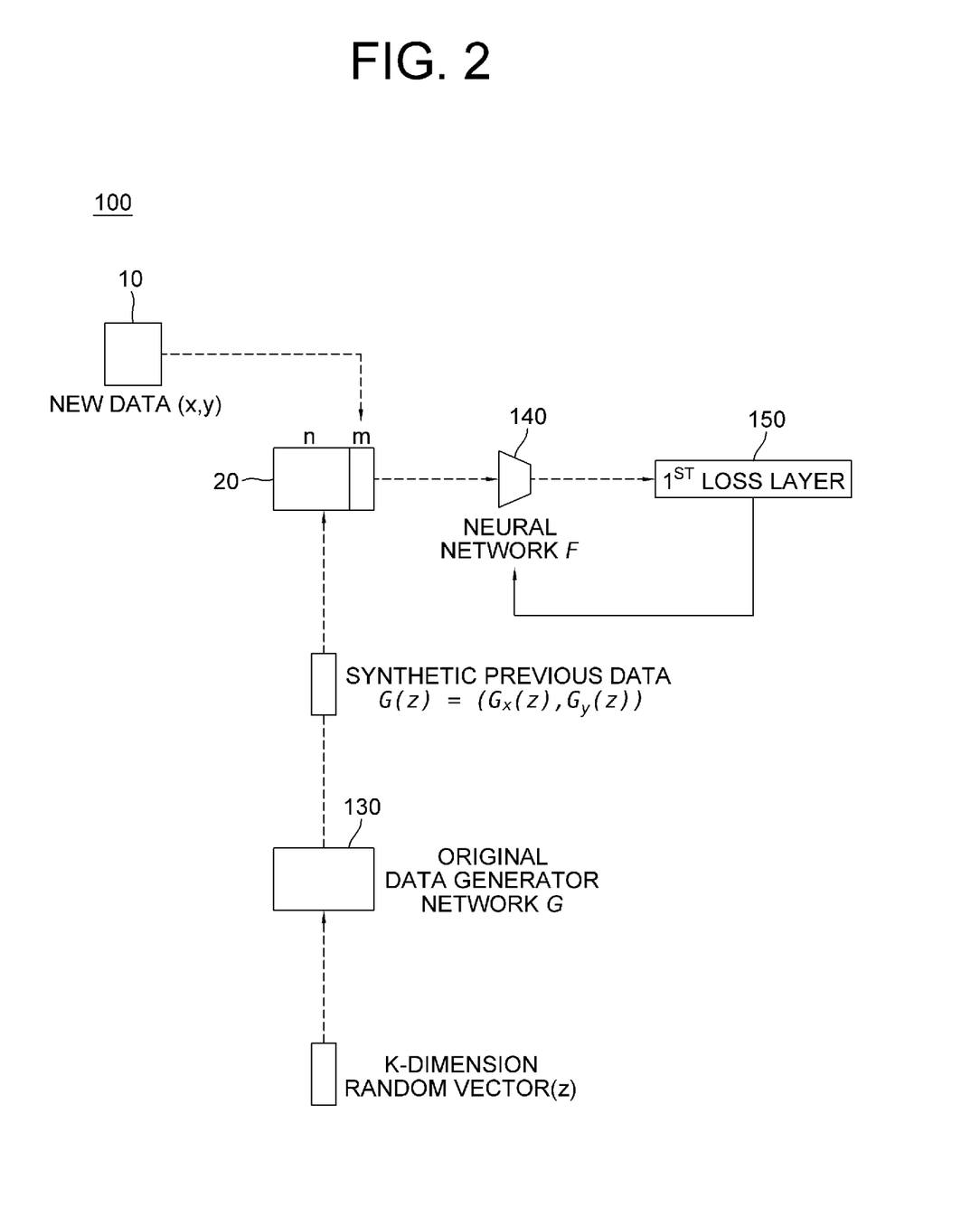
FIG. 2 is a drawing schematically illustrating a method for on-device continual learning of the neural network which analyzes input data by using deep learning in accordance with one example embodiment of the present disclosure.

A method for performing on-device continual learning of the neural network which analyzes input data by using deep learning via using the learning device 100 in accordance with one example embodiment of the present disclosure is described by referring to FIG. 2 as follows.

First, if new data 10 acquired for learning reaches a preset base volume M, the learning device 100 may sample the new data 10 such that the new data 10 has a preset first volume m.

Herein, the new data 10 may be acquired from at least one external device or at least one local device itself including a neural network 140.

Meanwhile, when sampling the new data 10, the learning device 100 may select part of the new data 10 by an amount of the preset first volume m by uniform-sampling, or shuffle the new data 10 and then select part of the new data 10 in an order of the shuffling by the amount of the preset first volume m, but the scope of the present disclosure is not limited thereto, and any sampling method that can select the part of the new data 10 by the amount of the preset first volume m may be used.

Then, the learning device 100 may input at least one k-dimension random vector into an original data generator network G 130 which has been learned, and may instruct the original data generator network G 130 to repeat a process of outputting first synthetic previous data corresponding to the k-dimension random vector, such that the first synthetic previous data has a preset second volume n.

Herein, the original data generator network G 130 has been learned previously to output previous data having been used for learning of the original data generator network G 130, and the first synthetic previous data may correspond to the previous data. And, the k-dimension random vector may be generated from an input ranging from 0 to 1 sampled for each element thereof. A process of learning the original data generator network G 130 will be described later.

Meanwhile, the original data generator network G 130 may be configured as corresponding to the neural network 140, and the neural network 140 may implement any network architecture appropriate to dimensions, value types, and ranges, etc. of (x, y) corresponding to the inputted new data (x, y) 10, on the fly.

As one example, by referring to FIG. 3, in case that the neural network 140 is a classifier which accepts at least one vector as its input, the original data generator network 130 may include one or more FC layers which apply at least one fully connected operation to k-dimension information corresponding to the k-dimension random vector and thus generate at least one D-dimensional vector $G_x(z)$ and at least one C-dimensional one-hot vector $G_y(z)$.

Figure 4:
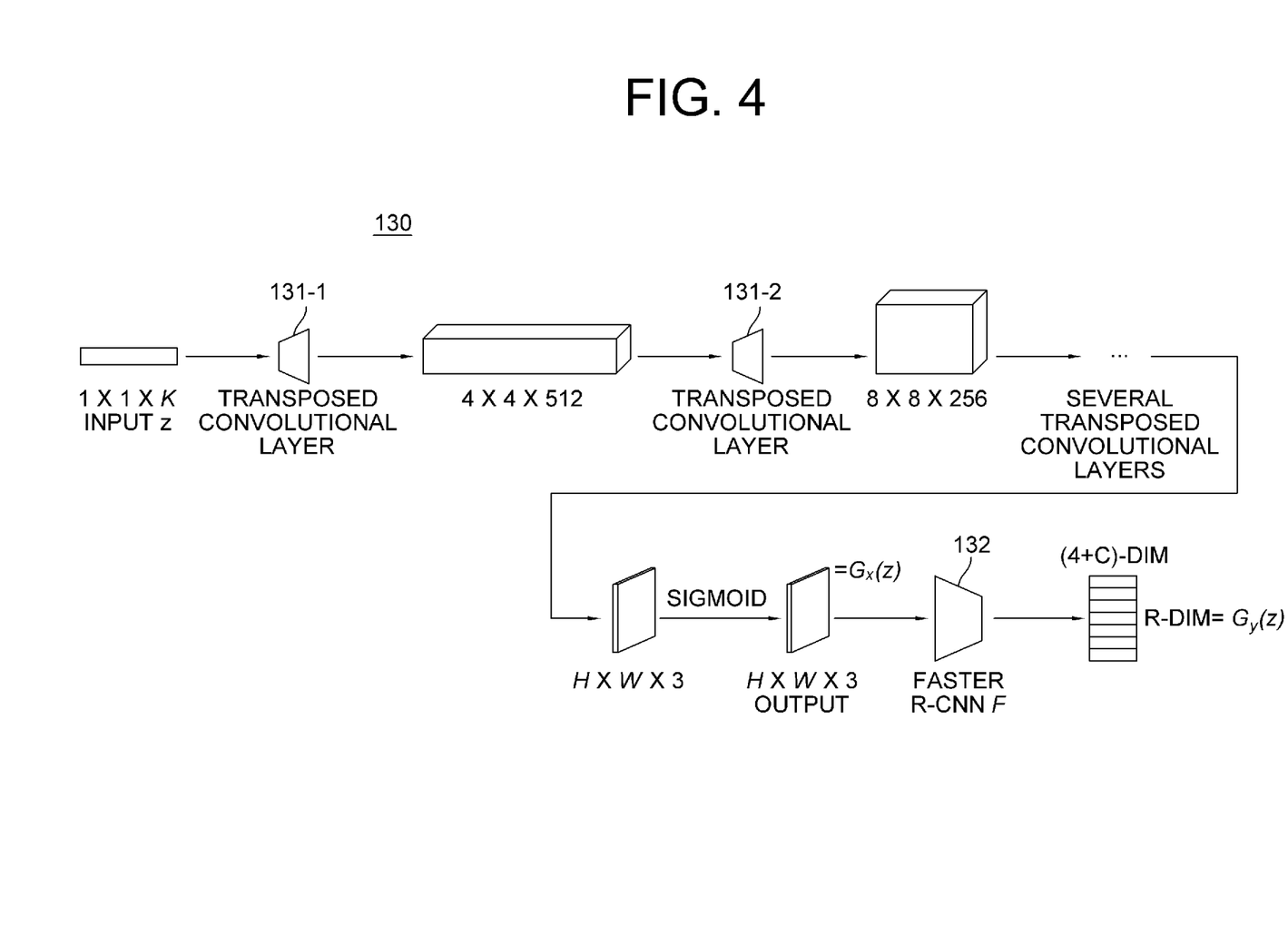
FIG. 4 is a drawing schematically illustrating another example of the data generator network which generates the past training data in a method for on-device continual learning of the neural network which analyzes input data by using deep learning in accordance with one example embodiment of the present disclosure.

As another example, by referring to FIG. 4, if the neural network 140 is an object detector which accepts at least one RGB image as its input, the original data generator network 130 may include one or more transposed convolutional layers 131-1, 131-2, etc. which transform 1×1×K information corresponding to the k-dimension random vector into at least one H×W×3 tensor $G_x(z)$, and a faster R-CNN 132 which analyzes the H×W×3 tensor and generates at least one R×(4+C) vector. Herein, an output end of the multiple transposed convolutional layers 131-1, 131-2, etc. may be provided with an activation function (sigmoid) that converts at least one H×W×3 vector into the H×W×3 tensor. And, of the R×(4+C) vector, R may include at least one R-dimensional vector $G_y(z)$ and (4+C) may include $x_1, y_1, x_2, y_2$, and the C-dimensional one-hot vector.

Then, by referring to FIG. 2 again, the learning device 100 may generate a first batch 20 to be used for a first current-learning by referring to the new data of the preset first volume m and the first synthetic previous data of the preset second volume n. Herein, the first batch 20 may have a volume of m+n.

Thereafter, the learning device 100 may instruct the neural network 140 to generate output information corresponding to the first batch 20 by inputting the first batch 20 into the neural network 140, may instruct a first loss layer 150 to calculate one or more first losses by referring to the output information and its corresponding GT. Herein, losses for the new data may be losses for the new data in the first batch 20 and may be expressed as $L(y_i, F(x_i))$, and losses for the previous data may be losses for synthetic previous data in the first batch 20 and may be expressed as $L(G_y(z_i), F(G_x(z_i)))$.

And the learning device 100 may perform the first current-learning of the neural network 140 by backpropagating the first losses.

Herein, the learning device 100 may perform a gradient descent of the neural network 140 by backpropagating the first losses, and accordingly, at least one weight $w_F$ of the neural network 140 may be updated as a following formula.

$$w_F \leftarrow w_F - \frac{\eta}{n+m} \frac{d}{dw_F}\left(\sum_{i=1}^{m} L(y_i, F(x_i)) + \sum_{i=1}^{n} L(G_y(z_i), F(G_x(z_i)))\right)$$

And the learning device 100 may repeat processes above, until the first losses reach a convergence state by backpropagating the first losses. That is, the learning device 100 may repeat generation of the first batch by using the new data and the synthetic previous data and may repeat the first current-learning of the neural network 140 by using the first batch, such that the first losses reach the convergence state.

Figure 5:
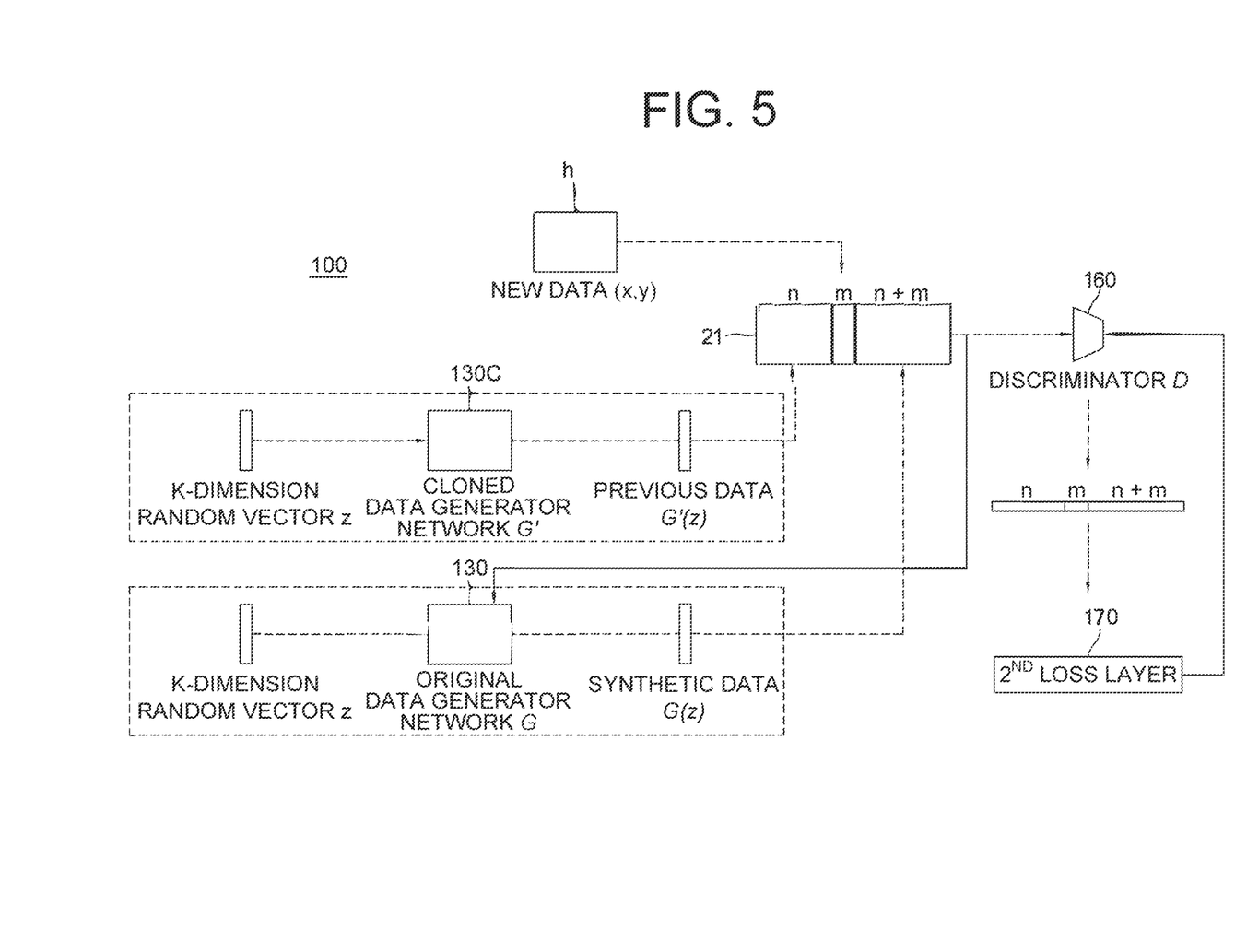
FIG. 5 is a drawing schematically illustrating a process for learning the data generator network in a method for on-device continual learning of the neural network which analyzes input data by using deep learning in accordance with one example embodiment of the present disclosure.

Next, by referring to FIG. 5, a process of learning the original data generator network 130 which has been learned previously is described. In the description below, the part easily deducible from the explanation of FIG. 2 will be omitted.

First, the learning device 100 may sample the new data h such that the new data h has the preset first volume m, and may clone the original data generator network G 130 to thereby generate a cloned data generator network G' 130C.

Then, the learning device 100 may instruct the cloned data generator network G' 130C to repeat a process of outputting second synthetic previous data G'(z) corresponding to the k-dimension random vector z, such that the second synthetic previous data G'(z) has the preset second volume n. Herein, the learning device 100 may regard the second synthetic previous data G'(z) of the preset second volume n as real data and may set the second synthetic previous data G'(z) as the previous data G'(z).

Also, the learning device 100 may instruct the original data generator network G 130 to repeat a process of outputting third synthetic previous data G(z) corresponding to the k-dimension random vector z, such that the third synthetic previous data G(z) has a preset third volume m+n. Herein, the preset third volume m+n may be a sum of the preset first volume m and the preset second volume n.

Thereafter, the learning device 100 may generate a second batch 21 to be used for a second current-learning by referring to the new data h of the preset first volume m, the second synthetic previous data G'(z) of the preset second volume n, and the third synthetic previous data G(z) of the preset third volume m+n.

Next, the learning device 100 may input the second batch 21 into a discriminator D 160, to thereby instruct the discriminator D 160 to generate score vectors corresponding to the second batch 21.

Herein, the score vectors may include score vectors of the second synthetic previous data G'(z) of the preset second volume n, score vectors of the new data h of the preset first volume m, and score vectors of the third synthetic previous data G(z) of the preset third volume m+n. The score vectors of the second synthetic previous data G'(z) of the preset second volume n may be expressed as $D(G'(z_1))$, . . . , $D(G'(z_n))$, score vectors of the new data h of the preset first volume m may be expressed as $D(h_1)$, . . . , $D(h_m)$, and score vectors of the third synthetic previous data G(z) of the preset third volume m+n may be expressed as $D(G(z_1))$, . . . , $D(G(z_{n+m}))$.

Then, the learning device 100 may instruct a second FC loss layer 170 to calculate one or more second losses by referring to the score vectors and their corresponding GTs, to thereby perform the second current-learning of the discriminator D 160 and the original data generator network G 130 by backpropagating the second losses.

Herein, the learning device 100 may perform a gradient ascent of the discriminator D 160 by backpropagating the second losses, and accordingly, at least one weight $w_D$ of the discriminator D 160 may be updated as a following formula.

$$w_D \leftarrow w_D + \frac{\eta}{2(n+m)} \frac{d}{dw_D}\left(\sum_{i=1}^{n} \log D(G'(z_i)) + \sum_{i=1}^{m} \log D(h_i) + \sum_{i=1}^{n+m} \log(1 - D(G(z_i)))\right)$$

Also, the learning device 100 may perform the gradient ascent of the original data generator network G 130 by backpropagating the second losses, and accordingly, at least one weight $w_G$ of the data generator network G 130 may be updated as a following formula.

$$w_G \leftarrow w_G + \frac{\eta}{n+m} \frac{d}{dD}\left(\sum_{i=1}^{n+m} \log D(G(z_i))\right) \frac{dD}{dw_G}$$

Meanwhile, the learning device 100 may regard the second synthetic previous data G'(z) from the cloned data generator network G' 130C as real data and may perform the second current-learning of the discriminator D 160, and may perform the second current-learning of the original data generator network G 130 such that third synthetic previous data score vectors, corresponding to the third synthetic previous data G(z), among the score vectors are maximized.

As a result, the real data used for learning the discriminator 160 may include the new data h and the previous data G'(z) which is the second synthetic previous data G'(z), and accordingly, the original data generator network G 130 may be learned to output the new data h which is the real data and the previous data G'(z) which is the second synthetic previous data.

And the learning device 100 may repeat processes above, until losses of the discriminator D 160 and losses of the original data generator network G 130 respectively reach convergence states by backpropagating the second losses. That is, the learning device 100 may repeat generation of the second batch by using the second synthetic previous data, the new data, and the third synthetic previous data, and may repeat the second current-learning of the discriminator 160 and the original data generator network 130 by using the second batch, such that the losses of the discriminator 160 and the losses of the original data generator network 130 reach the convergence states.

Herein, a ratio of the previous data to the new data used for learning the discriminator 160 may be n:m=N:M, and if all volume M of the new data is learned by using the second batch, a ratio of the previous data to the new data, both of which are outputted from the learned original data generator network G 130, may be N:M.

Thereafter, if the second current-learning is completed, for example, if the losses of the discriminator 160 and the losses of the original data generator network 130 reach the convergence states, the learning device 100 may delete the new data and may update the original data generator network such that the new data and the second synthetic previous data can be outputted as the previous data for use in a next learning.

That is, because the original data generator network 130 has been learned to output the previous data and the new data corresponding to the real data used for the second current-learning, the new data can be deleted, and if the next learning is to be performed, the original data generator network 130 may output the new data and the previous data used for a current learning, and thus the previous data for use in the next learning may be acquired.

Meanwhile, if the current learning, including the first current-learning and the second current-learning, is a first learning, then the first current-learning and the second current-learning may be performed without the previous data.

That is, the learning device 100 may generate the first batch by using only the new data of the preset first volume m, and may perform the first current-learning by using the first batch such that the losses of the neural network 140 reach the convergence state.

And the learning device 100 may instruct the original data generator network 130 to repeat a process of outputting the third synthetic previous data corresponding to the k-dimension random vector such that the third synthetic previous data has the preset first volume m, may generate the second batch by referring to the new data of the preset first volume and the third synthetic previous data of the preset first volume, and may perform the second current-learning by using the second batch such that the losses of the discriminator 160 and the losses of the original data generator network 130 reach the convergence states.

Thereafter, the learning device 100 may delete the new data used for the current learning and initialize the new data as the previous data.

For reference, in the description below, the phrase "for training" or "training" is added for terms related to the learning process, and the phrase "for testing" or "testing" is added for terms related to the testing process, to avoid possible confusion.

Figure 6:
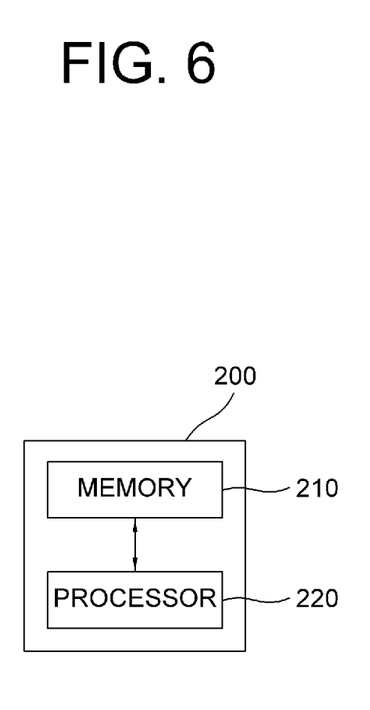
FIG. 6 is a drawing schematically illustrating a testing device for testing the neural network which has completed on-device continual learning in accordance with one example embodiment of the present disclosure.

FIG. 6 is a drawing schematically illustrating a testing device for testing the neural network which has completed on-device continual learning in accordance with one example embodiment of the present disclosure. By referring to FIG. 6, the testing device 200 may include a memory 210 for storing instructions to test the neural network which has completed on-device continual learning, and a processor 220 for performing processes corresponding to the instructions in the memory 210 to test the neural network which has completed on-device continual learning.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Figure 7:
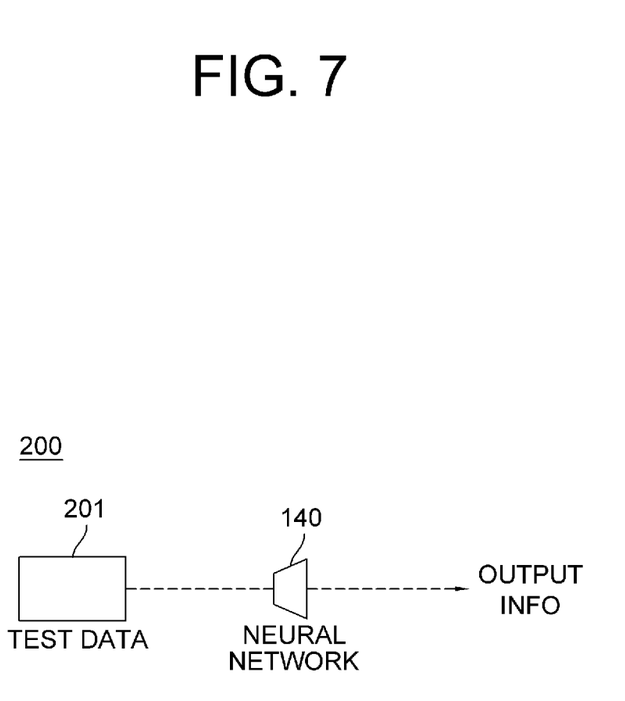
FIG. 7 is a drawing schematically illustrating a testing method for testing the neural network which has completed on-device continual learning in accordance with one example embodiment of the present disclosure.

A method for testing the neural network which has completed on-device continual learning by using the testing device 200 in accordance with one example embodiment of the present disclosure is described by referring to FIG. 7 as follows.

On condition that the neural network 140 has been learned in accordance with the processes aforementioned, the testing device 200 may acquire or support another device to acquire test data 201. Herein, the test data 201 may include image information, sensor information, voice information, etc, but the scope of the present disclosure is not limited thereto, and may include any input data whose features can be analyzed.

And the testing device 200 may input the test data 201 into the neural network 140 and instruct the neural network 140 to generate output information corresponding to the test data 201.

Herein, the learning device may have completed processes of (a) if new data acquired for learning reaches the preset base volume, sampling the new data such that the new data has the preset first volume, inputting at least one k-dimension random vector into the original data generator network which has been learned, to thereby instruct the original data generator network to repeat a process of outputting the first synthetic previous data corresponding to the k-dimension random vector, such that the first synthetic previous data has the preset second volume, and generating the first batch to be used for the first current-learning by referring to the new data of the preset first volume and the first synthetic previous data of the preset second volume; and (b) instructing the neural network 140 to generate the output information corresponding to the first batch by inputting the first batch into the neural network 140, instructing the first loss layer to calculate the first losses by referring to the output information and its corresponding GT, and performing the first current-learning of the neural network by backpropagating the first losses.

And the learning device may have completed processes of sampling the new data such that the new data has the preset first volume m, cloning the original data generator network to thereby generate the cloned data generator network, instructing the cloned data generator network to repeat a process of outputting the second synthetic previous data corresponding to the k-dimension random vector such that the second synthetic previous data has the preset second volume, instructing the original data generator network to repeat a process of outputting the third synthetic previous data corresponding to the k-dimension random vector such that the third synthetic previous data has the preset third volume, and generating the second batch to be used for the second current-learning by referring to the new data of the preset first volume, the second synthetic previous data of the preset second volume, and the third synthetic previous data of the preset third volume; and instructing the discriminator to generate the score vectors corresponding to the second batch by inputting the second batch into the discriminator, instructing the second loss layer to calculate the second losses by referring to the score vectors and their corresponding GTs, and performing the second current-learning of the discriminator and the original data generator network by backpropagating the second losses.

The present disclosure has an effect of enabling on-device learning on a local device without storing past training data by efficiently generating the past training data used for previous learning.

The present disclosure has another effect of preventing catastrophic forgetting of the neural network when learning, by on-device learning of the neural network using new training data and the past training data generated by the data generator network.

The present disclosure has still another effect of saving resources such as storage, and securing privacy by using generative adversarial networks (GANs), online learning, and the like.

Thus, the method can be used for smartphones, drones, vessels, or a military purpose.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for on-device continual training of a neural network which analyzes input data, comprising steps of:
   (a) when the input data comprises a preset base volume, sampling, by a learning device, first new data from the input data such that the first new data has a preset first volume, inputting a first k-dimension random vector into an original data generator network which has been trained, outputting first synthetic previous data from the original data generator network, and generating a first batch by combining the first new data and the first synthetic previous data,
   wherein the first synthetic previous data corresponds to the first k-dimension random vector and previous data used to train the original data generator network,
   wherein the first synthetic previous data has a preset second volume;
   (b) the learning device training the neural network at a first current iteration by instructing the neural network to generate output information by inputting the first batch into the neural network, instructing a first loss layer to calculate one or more first losses by referring to the output information and a ground truth ("GT") of the output information, and performing the training of the neural network by backpropagating the first losses to the neural network;
   (c) sampling second new data from the input data such that the second new data has the preset first volume, cloning the original data generator network to thereby generate a cloned data generator network, inputting a second k-dimension random vector into the original data generator network and the cloned data generator network, outputting second synthetic previous data from the cloned data generator network, outputting third synthetic previous data from the original data generator network, and generating a second batch by combining the second new data, the second synthetic previous data, and the third synthetic previous data,
   wherein the second synthetic previous data and the third synthetic previous data correspond to the second k-dimension random vector and the previous data used to train the original data generator network,
   wherein the second synthetic previous data has the preset second volume,
   wherein the third synthetic previous data has a preset third volume equal to a sum of the preset first volume and the preset second volume; and
   (d) instructing, by the learning device, a discriminator to generate score vectors corresponding to the second batch by inputting the second batch into the discriminator, instructing a second loss layer to calculate one or more second losses by referring to the score vectors and corresponding ground truths ("GTs") for the score vectors, and performing training of the discriminator and the original data generator network by backpropagating the second losses to the discriminator and the original data generator network.

2. The method of claim 1, wherein the learning device repeats the steps of (c) and (d) until losses of the discriminator and losses of the original data generator network respectively reach convergence states by backpropagating the second losses.

3. The method of claim 1, wherein, at the step of (d), the learning device performs a gradient ascent of the discriminator and the original data generator network by backpropagating the second losses.

4. The method of claim 1, wherein, at the step of (d), the learning device, in performing the training of the discriminator by backpropagating the second losses, regards the second synthetic previous data from the cloned data generator network as real data.

5. The method of claim 1, wherein, at the step of (d), the learning device performs the training of the original data generator network such that ones of the score vectors corresponding to the third synthetic previous data are maximized.

6. The method of claim 1, wherein, at the step of (d), the learning device deletes the second new data after training the original data generator network such that such that the previous data output by the original data generator network at a next training corresponds to the second new data and the second synthetic previous data.

7. The method of claim 1, wherein, when the training of the discriminator and the original the original data generator network is a first training, at the step of (a), the learning device generates the first batch using only the first new data, and wherein, at the step of (c), the learning device generates the second batch using only the second new data and the third synthetic previous data.

8. The method of claim 1, wherein the learning device repeats the steps of (a) and (b) until the first losses reach a convergence state by backpropagating the first losses.

9. The method of claim 1, wherein, at the step of (b), the learning device performs a gradient descent of the neural network by backpropagating the first losses.

10. The method of claim 1, wherein, in case that the neural network is a classifier which accepts at least one vector as its input, the original data generator network includes one or more fully connected layers which apply at least one fully connected operation to k-dimension information corresponding to at least one of the first and second k-dimension random vectors and generate at least one D-dimensional vector and at least one C-dimensional one-hot vector, where k is an integer representing a dimension of the information input, D is an integer representing a dimension of an output vector, and C is an integer representing a dimension of another output vector.

11. The method of claim 1, wherein, when the neural network is an object detector which accepts at least one red-green-blue image as its input, the original data generator network includes one or more transposed convolutional layers which transform 1×1×K information corresponding to at least one of the first and second k-dimension random vectors into at least one H×W×3 tensor, and a faster R-CNN (Convolutional Neural Network) which analyzes the H×W×3 tensor and generates at least one R×(4+C) vector, wherein R includes at least one R-dimensional vector and (4+C) includes $x_1$, $y_1$, $x_2$, $y_2$, and at least one C-dimensional one-hot vector, where K is an integer representing a dimension of information input, C is an integer representing a dimension of an output, H is a height of a tensor $G_x(z)$, W is a width of a tensor $G_x(z)$, R is an integer equal to 4+C representing a dimension of an output, and $x_1$, $y_1$, $x_2$, $y_2$ are parts of an R-dimensional output.

12. A testing method for testing a neural network which has completed on-device continual learning, comprising steps of:
(a) a testing device acquiring test data, on condition that a learning device has performed processes of:
(1) sampling first new data from input data having a preset base volume such that the first new data has a preset first volume, inputting a first k-dimension random vector into an original data generator network which has been trained, outputting first synthetic previous data from the original data generator network, and generating a first batch by combining the first new data and the first synthetic previous data, wherein the first synthetic previous data corresponds to the first k-dimension random vector and previous data used to train the original data generator network, and wherein the first synthetic previous data has a preset second volume;
(2) instructing the neural network to generate output information for training by inputting the first batch into the neural network, instructing a first loss layer to calculate one or more first losses by referring to the output information for training and a ground truth ("GT") of the output information, and training the neural network by backpropagating the first losses to the neural network;
(3) sampling second new data from the input data such that the second new data has the preset first volume, cloning the original data generator network to thereby generate a cloned data generator network, inputting a second k-dimension random vector into the original data generator network and the cloned data generator network, outputting second synthetic previous data from the cloned data generator network, outputting third synthetic previous data from the original data generator network, and generating a second batch by combining the second new data, the second synthetic previous data, and the third synthetic previous data, wherein the second synthetic previous data and the third synthetic previous data correspond to the second k-dimension random vector and the previous data used to train the original data generator network, wherein the second synthetic previous data has the preset second volume, and wherein the third synthetic previous data has a preset third volume equal to a sum of the preset first volume and the preset second volume; and
(4) instructing, by the learning device, a discriminator to generate score vectors corresponding to the second batch by inputting the second batch into the discriminator, instructing a second loss layer to calculate one or more second losses by referring to the score vectors and corresponding ground truths ("GTs") for the score vectors, and performing training of the discriminator and the original data generator network by backpropagating the second losses to the discriminator and the original data generator network; and
(b) the testing device instructing the neural network to generate output information for testing corresponding to the test data by inputting the test data into the neural network.

13. A learning device for on-device continual training of a neural network which analyzes input data, comprising:
at least one memory that stores instructions; and
at least one processor configured to execute the instructions to perform processes of:
(I) when the input data comprises a preset base volume, sampling first new data from the input data such that the first new data has a preset first volume, inputting a first k-dimension random vector into an original data generator network which has been trained, outputting first synthetic previous data from the original data generator network, and generating a first batch by combining the new data and the first synthetic previous data, wherein the first synthetic previous data corresponds to the first k-dimension random vector and previous data used to train the original data generator network, and wherein the first synthetic previous data has a preset second volume,
(II) instructing the neural network to generate output information by inputting the first batch into the neural network, instructing a first loss layer to calculate one or more first losses by referring to the output information and ground truth ("GT") of the output information, and performing the training of the neural network by backpropagating the first losses to the neural network,
(III) sampling second new data from the input data such that the second new data has the preset first volume, cloning the original data generator network to thereby generate a cloned data generator network, inputting a second k-dimension random vector into the original data generator network and the cloned data generator network, outputting second synthetic previous data from the cloned data generator network, outputting third synthetic previous data from the original data generator network, and generating a second batch by combining the second new data, the second synthetic previous data, and the third synthetic previous data, wherein the second synthetic previous data and the third synthetic previous data correspond to the second k-dimension random vector and the previous data used to train the original data generator network, wherein the second synthetic previous data has the preset second volume, wherein the third synthetic previous data has a preset third volume equal to a sum of the preset first volume and the preset second volume; and (IV) instructing a discriminator to generate score vectors corresponding to the second batch by inputting the second batch into the discriminator, instructing a second loss layer to calculate one or more second losses by referring to the score vectors and corresponding ground truths ("GTs") for the score vectors, and performing training of the discriminator and the original data generator network by backpropagating the second losses to the discriminator and the original data generator network.

14. The learning device of claim 13, wherein the processor repeats the processes of (III) and (IV) until losses of the discriminator and losses of the original data generator network respectively reach convergence states by backpropagating the second losses.

15. The learning device of claim 13, wherein, at the process of (IV), the processor performs a gradient ascent of the discriminator and the original data generator network by backpropagating the second losses.

16. The learning device of claim 13, wherein, at the process of (IV), the processor, in performing the training of the discriminator by backpropagating the second losses, regards the second synthetic previous data from the cloned data generator network as real data.

17. The learning device of claim 13, wherein, at the process of (IV), the processor performs the training of the original data generator network such that ones of the score vectors corresponding to the third synthetic previous data are maximized.

18. The learning device of claim 13, wherein, at the process of (IV), the processor deletes the second new data after training the original data generator network such that the previous data output by the original data generator network at a next training corresponds to the second new data and the second synthetic previous data.

19. The learning device of claim 13, wherein, when the training of the discriminator and the original the original data generator network is a first training, at the process of (I), the processor generates the first batch using only the first new data, and wherein, at the process of (III), the processor generates the second batch by referring to the second new data and the third synthetic previous data.

20. The learning device of claim 13, wherein the processor repeats the processes of (I) and (II) until the first losses reach a convergence state by backpropagating the first losses.

21. The learning device of claim 13, wherein, at the process of (II), the processor performs a gradient descent of the neural network by backpropagating the first losses.

22. The learning device of claim 13, wherein, in case that the neural network is a classifier which accepts at least one vector as its input, the original data generator network includes one or more fully connected layers which apply at least one fully connected operation to k-dimension information corresponding to at least one of the first and second k-dimension random vectors and generate at least one D-dimensional vector and at least one C-dimensional one-hot vector, where k is an integer representing a dimension of the information input, D is an integer representing a dimension of an output vector, and C is an integer representing a dimension of another output vector.

23. The learning device of claim 13, wherein, when the neural network is an object detector which accepts at least one red-green-blue image as its input, the original data generator network includes one or more transposed convolutional layers which transform 1×1×K information corresponding to at least one of the first and second k-dimension random vectors into at least one H×W×3 tensor, and a faster R-CNN (Convolutional Neural Network) which analyzes the H×W×3 tensor and generates at least one R×(4+C) vector, wherein R includes at least one R-dimensional vector and (4+C) includes $x_1$, $y_1$, $x_2$, $y_2$, and at least one C-dimensional one-hot vector, where K is an integer representing a dimension of information input, C is an integer representing a dimension of an output, H is a height of a tensor $G_x(z)$, W is a width of a tensor $G_x(z)$, R is an integer equal to 4+C representing a dimension of an output, and $x_1$, $y_1$, $x_2$, $y_2$ are parts of an R-dimensional output.

24. A testing device for testing a neural network which has completed on-device continual learning, comprising:
   at least one memory that stores instructions; and
   at least one processor configured to execute the instructions to perform a process of instructing the neural network to generate output information for testing corresponding to acquired test data by inputting the test data into the neural network,
   wherein the at least one processor is configured to execute the instructions on condition that a learning device has performed processes of:
   (1) sampling first new data from input data having a preset base volume such that the first new data has a preset first volume, inputting a first k-dimension random vector into an original data generator network which has been trained, outputting first synthetic previous data from the original data generator network, and generating a first batch by combining the first new data and the first synthetic previous data, wherein the first synthetic previous data corresponds to the first k-dimension random vector and previous data used to train the original data generator network, and wherein the first synthetic previous data has a preset second volume;
   (2) instructing the neural network to generate output information for training by inputting the first batch into the neural network, instructing a first loss layer to calculate one or more first losses by referring to the output information for training and a ground truth ("GT") of the output information, and training the neural network by backpropagating the first losses to the neural network;
   (3) sampling second new data from the input data such that the second new data has the preset first volume, cloning the original data generator network to thereby generate a cloned data generator network, inputting a second k-dimension random vector into the original data generator network and the cloned data generator network, outputting second synthetic previous data from the cloned data generator network, outputting third synthetic previous data from the original data generator network, and generating a second batch by combining the second new data, the second synthetic previous data, and the third synthetic previous data, wherein the second synthetic previous data and the third synthetic previous data correspond to the second k-dimension random vector and the previous data used to train the original data generator network, wherein the second synthetic previous data has the preset second volume, and wherein the third synthetic previous data has a preset third volume equal to a sum of the preset first volume and the preset second volume; and
   (4) instructing, by the learning device, a discriminator to generate score vectors corresponding to the second batch by inputting the second batch into the discriminator, instructing a second loss layer to calculate one or more second losses by referring to the score vectors and corresponding ground truths ("GTs") for the score vectors, and performing training of the discriminator and the original data generator network by backpropagating the second losses to the discriminator and the original data generator network.

* * * * *